(12) United States Patent
Tohme et al.

(10) Patent No.: US 12,333,687 B2
(45) Date of Patent: Jun. 17, 2025

(54) METHODS AND SYSTEMS FOR IMAGE DENOISING

(71) Applicant: GE Precision Healthcare LLC, Wauwatosa, WI (US)

(72) Inventors: Michel S. Tohme, Waukesha, WI (US); Vincent Bismuth, Yvelines (FR); Ludovic Boilevin Kayl, Yvelines (FR); German Guillermo Vera Gonzalez, Menomonee Falls, WI (US); Tao Tan, Gelderland (NL); Gopal B. Avinash, Concord, CA (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 319 days.

(21) Appl. No.: 17/813,264

(22) Filed: Jul. 18, 2022

(65) Prior Publication Data
US 2024/0020792 A1 Jan. 18, 2024

(51) Int. Cl.
*G06T 5/70* (2024.01)
*G06T 7/80* (2017.01)

(52) U.S. Cl.
CPC ........... *G06T 5/70* (2024.01); *G06T 7/80* (2017.01); *G06T 2207/10081* (2013.01); *G06T 2207/20081* (2013.01)

(58) Field of Classification Search
CPC ........ G16H 50/20; G16H 30/20; G16H 30/40; G06T 5/70; G06T 2207/20084; G06T 2207/20081; G06T 2207/10116; G06T 7/0012; G06T 5/60; G06T 2207/10081; G06T 5/92; G06T 7/80; G06T 2211/441; G06N 3/02; G06N 3/08; G06N 20/00; G06V 10/30; G06V 10/82
See application file for complete search history.

(56) References Cited

U.S. PATENT DOCUMENTS 9,330,443 B1 * 5/2016 Zou .......................... G06T 5/50
10,573,031 B2 2/2020 Mailhe et al.
(Continued)

FOREIGN PATENT DOCUMENTS

CN 112801887 A 5/2021
EP 3410392 A1 12/2018
(Continued)

OTHER PUBLICATIONS

Nair, Tejas, et al. "Adaptive image denoising using a deep neural network with a noise correction map." Applications of Digital Image Processing XLIII. vol. 11510. SPIE, 2020 (Year: 2020).*

(Continued)

*Primary Examiner* — Aaron W Carter
*Assistant Examiner* — Courtney Joan Nelson
(74) *Attorney, Agent, or Firm* — McCoy Russell LLP

(57) ABSTRACT

Various methods and systems are provided for denoising images. In one example, a method includes obtaining an input image and a noise map representing noise in the input image, generating, from the noise map and based on a calibration factor, a strength map, entering the input image and the strength map as input to a denoising model trained to output a denoised image based on the input image and the strength map, and displaying and/or saving the denoised image output by the denoising model.

15 Claims, 11 Drawing Sheets

(56) References Cited

U.S. PATENT DOCUMENTS

| | | | |
|---|---|---|---|
| 10,755,395 B2 * | 8/2020 | Yu | G06F 18/2136 |
| 10,832,381 B2 * | 11/2020 | Strobel | G06T 5/70 |
| 11,037,053 B2 | 6/2021 | Moon | |
| 11,176,428 B2 | 11/2021 | Lee et al. | |
| 11,288,775 B2 | 3/2022 | Tohme et al. | |
| 2011/0286651 A1 | 11/2011 | Yu et al. | |
| 2013/0202080 A1 | 8/2013 | Yu et al. | |
| 2015/0117596 A1 | 4/2015 | Cao et al. | |

FOREIGN PATENT DOCUMENTS

| | | |
|---|---|---|
| EP | 2890300 B1 | 1/2019 |
| WO | 2019195713 A1 | 10/2019 |

OTHER PUBLICATIONS

K. Zhang, W. Zuo and L. Zhang, "FFDNet: Toward a Fast and Flexible Solution for CNN-Based Image Denoising," in IEEE Transactions on Image Processing, vol. 27, No. 9, pp. 4608-4622, Sep. 2018, doi: 10.1109/TIP.2018.2839891 (Year: 2018).*

EP application 23183728.7 filed Jul. 5, 2023—extended Search Report issued Oct. 16, 2023; 11 pages.

Guo Shi et al: "Toward Convolutional Blind Denoising of Real Photographs", 2019 IEEE/CVF Conference on Computer Vision and Pattern Recognition (CVPR), IEEE, Jun. 15, 2019 (Jun. 15, 2019), pp. 1712-1722, XP033687535, DOI: 10.1109/CVPR.2019. 00181.

Lebrun, M. et al., "Secrets of image denoising cuisine," Acta Numerica, vol. 21, May 2012, Available Online Apr. 19, 2012, 102 pages.

Zhang, K. et al., "FFDNet: Toward a Fast and Flexible Solution for CNN based Image Denoising," IEEE Transactions on Image Processing, May 25, 2018, 15 pages.

Kim, Y. et al., "Adaptively Tuning a Convolutional Neural Network by Gate Process for Image Denoising," IEEE Access, vol. 7, May 17, 2019, 10 pages.

Bahnemiri, S. et al., "Learning-based Noise Component Map Estimation for Image Denoising," arXiv Cornell University Website, Available Online at https://arxiv.org/abs/2109.11877, Available as Early as Sep. 24, 2021, 5 pages.

Nair, T. et al., "Adaptive image denoising using a deep neural network with a noise correction map," Proceedings of the SPIE Optical Engineering + Applications, vol. 11510, Applications of Digital Image Processing XLIII, Aug. 21, 2020, Bellingham, Washington, 10 pages.

* cited by examiner

METHODS AND SYSTEMS FOR IMAGE DENOISING

FIELD

Embodiments of the subject matter disclosed herein relate to imaging, and more particularly to denoising images.

BACKGROUND

Mammography is a medical imaging procedure that includes acquisition of x-ray images for detecting the presence of one or more tumors or lesions in a breast. In digital mammography, a scout or pre-shot image may be taken of a patient to determine an x-ray technique (e.g., x-ray tube current and voltage, exposure time) to acquire images of the patient having a sufficient brightness. Upon determination of the x-ray technique, one or more x-ray images of the patient may be acquired. In some examples, multiple x-ray images may be acquired at different view angles and/or at different energy levels. It may be desirable to reduce a dosage of x-rays used to acquire the x-ray images, but low dose x-ray images may exhibit noise that may limit dose reduction.

BRIEF DESCRIPTION

In one embodiment, a method includes obtaining an input image and a noise map representing noise in the input image, generating, from the noise map and based on a calibration function, a strength map, entering the input image and the strength map as input to a denoising model trained to output a denoised image based on the input image and the strength map, and displaying and/or saving the denoised image output by the denoising model.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

The following description relates to various embodiments for calibrating a denoising model configured to reduce noise present in digital images to select/control denoising properties in order to achieve given objectives, such as desired noise reduction, while limiting artifacts such as feature loss. In digital images, noise may be introduced when exposure time is limited in order to reduce motion-induced blur or lower patient radiation dose, for example. Denoising models have been developed to facilitate removal of noise in digital images. Some denoising models, such as deep learning models, may have control parameters that can be adjusted to tune the strength of the denoising. For example, deep learning denoising models may take as input (along with an image to be denoised) a noise map that conveys the amount and distribution of noise in the image to be denoised, and the strength of this noise map may be tuned to achieve desired denoising (e.g., the noise map may be scaled by an amount to achieve the desired denoising). However, the impact of these control parameters is not intuitive and is not easy to predict. As a result, denoising models may be tuned to sufficiently denoise a given image, but introduce artifacts such as loss of detail and/or unrealistic smoothing.

Thus, according to embodiments disclosed herein, a trained denoising model (such as a deep learning model trained to denoise medical images) may be calibrated to select a tuning control parameter such as noise map strength based on the image to be denoised. Specifically, via a calibration phase after the denoising model has been trained, a calibration function(s) may be learned that maps the signal level of an input image and a desired noise reduction to a noise map strength that may be used to scale or otherwise adjust the noise map that is input to denoise the input image.

The calibration phase may be applied to a suitable denoising model that has been trained to denoise images using a noise map. Example denoising models may include convolutional neural network (CNN) based models. The denoising models may be trained to denoise virtually any digital image, including visible light images, x-ray images, computed tomography images, and the like. The methods for calibration of a denoising model and inference using a calibrated denoising model are described herein with reference to an x-ray system in the form of a digital mammography system. However, it is to be appreciated that the methods disclosed herein may be applied with denoising models trained to denoise images obtained with other imaging modalities, without departing from the scope of this disclosure.

Figure 1:
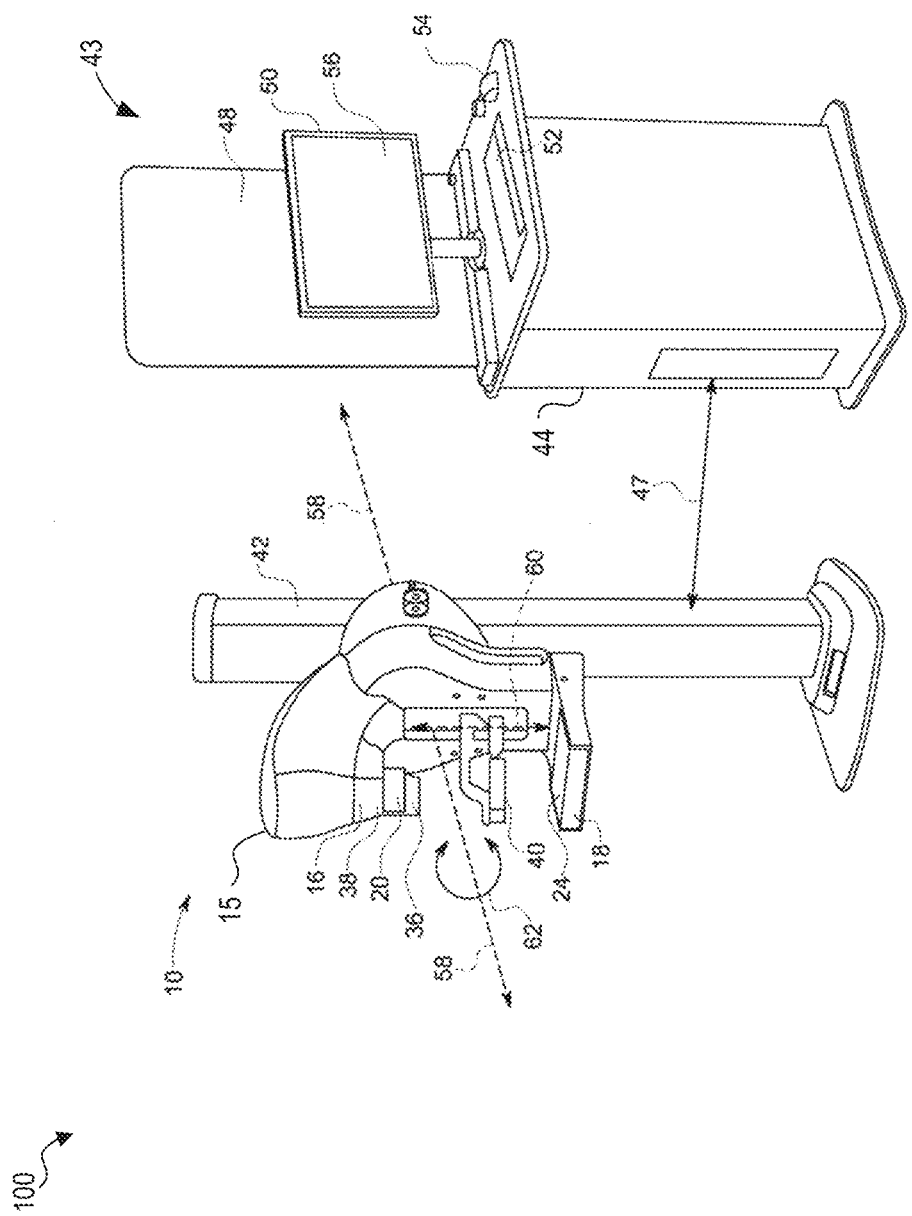
FIG. 1 is a schematic illustration of a digital mammography system according to an embodiment.

Referring to FIG. 1, a digital mammography system 100 including an x-ray system 10 for performing a mammography procedure is shown, according to an embodiment of the disclosure. In some examples, the x-ray system 10 may be a tomosynthesis system, such as a digital breast tomosynthesis (DBT) system. In some examples, the x-ray system 10 may be configured to acquire dual-energy images, which may facilitate increased visualization of certain structures (e.g., vasculature) when the patient is injected with a contrast agent. Further, the x-ray system 10 may be used to perform one or more procedures including digital tomosynthesis imaging, and DBT guided breast biopsy.

The x-ray system 10 includes a support structure 42, to which a radiation source 16, a radiation detector 18, and a collimator 20 are attached. The radiation source 16 is housed within a gantry 15 that is movably coupled to the support structure 42. In particular, the gantry 15 may be mounted to the support structure 42 such that the gantry 15 including the radiation source 16 can rotate around an axis 58 in relation to the radiation detector 18. An angular range of rotation of the gantry 15 housing the radiation source 16 indicates a rotation up to a desired degree on either direction about the axis 58. For example, the angular range of rotation of the radiation source 16 may be $-\theta$ to $+\theta$, where $\theta$ may be such that the angular range is a limited angle range, less than 360 degrees. An exemplary x-ray system may have an angular range of ±11 degrees, which may allow rotation of the gantry (that is rotation of the radiation source) from −11 degrees to +11 degrees about an axis of rotation of the gantry. The angular range may vary depending on the manufacturing specifications. For example, the angular range for DBT systems may be approximately ±11 degrees to ±60 degrees, depending on the manufacturing specifications. In some examples, the gantry 15 may be fixed and may not rotate.

The radiation source 16 is directed toward a volume or object to be imaged, and is configured to emit radiation rays at desired times to acquire one or more images. The radiation detector 18 is configured to receive the radiation rays via a surface 24. The detector 18 may be any one of a variety of different detectors, such as an x-ray detector, digital radiography detector, or flat panel detector. The collimator 20 is disposed adjacent to the radiation source 16 and is configured to adjust an irradiated zone of a subject.

In some embodiments, the system 10 may further include a patient shield 36 mounted to the radiation source 16 via face shield rails 38 such that a patient's body part (e.g., head) is not directly under the radiation. The system 10 may further include a compression paddle 40, which may be movable upward and downward in relation to the support structure along a vertical axis 60. Thus, the compression paddle 40 may be adjusted to be positioned closer to the radiation detector 18 by moving the compression paddle 40 downward toward the detector 18, and a distance between the detector 18 and the compression paddle 40 may be increased by moving the compression paddle upward along the vertical axis 60 away from the detector. The movement of the compression paddle 40 may be adjusted by a user via compression paddle actuator (not shown) included in the x-ray system 10. The compression paddle 40 may hold a body part, such as a breast, in place against the surface 24 of the radiation detector 18. The compression paddle 40 may compress the body part, and hold the body part still in place while optionally providing apertures to allow for insertion of a biopsy needle, such as a core needle, or a vacuum assisted core needle. In this way, compression paddle 40 may be utilized to compress the body part to minimize the thickness traversed by the x-rays and to help reduce movement of the body part due to the patient moving. The x-ray system 10 may also include an object support (not shown) on which the body part may be positioned.

The digital mammography system 100 may further include workstation 43 comprising a controller 44 including at least one processor and a memory. The controller 44 may be communicatively coupled to one or more components of the x-ray system 10 including one or more of the radiation source 16, radiation detector 18, the compression paddle 40, and a biopsy device. In an embodiment, the communication between the controller and the x-ray system 10 may be via a wireless communication system. In other embodiments, the controller 44 may be in electrical communication with the one or more components of the x-ray system via a cable 47. Further, in an exemplary embodiment, as shown in FIG. 1, the controller 44 is integrated into workstation 43. In other embodiments, the controller 44 may be integrated into one or more of the various components of the system 10 disclosed above. Further, the controller 44 may include processing circuitry that executes stored program logic and may be any one of different computers, processors, controllers, or combination thereof that are available for and compatible with the various types of equipment and devices used in the x-ray system 10.

The workstation 43 may include a radiation shield 48 that protects an operator of the system 10 from the radiation rays emitted by the radiation source 16. The workstation 43 may further include a user interface 50 (in the form of a display), a keyboard 52, mouse 54, and/or other appropriate user input devices that facilitate control of the system 10.

Controller 44 may adjust the operation and function of the x-ray system 10. As an example, the controller 44 may provide timing control, as to when the x-ray source 16 emits x-rays, and may further adjust how the detector 18 reads and conveys information or signals after the x-rays hit the detector 18, and how the x-ray source 16 and the detector 18 move relative to one another and relative to the body part being imaged. The controller 44 may also control how information, including images and data acquired during the operation, is processed, displayed, stored, and manipulated. Various processing steps as described herein with respect to FIGS. 2 and 3, performed by the controller 44, may be provided by a set of instructions stored in non-transitory memory of controller 44.

Further, as stated above, the radiation detector 18 receives the radiation rays 22 emitted by the radiation source 16. In particular, during imaging with the x-ray system, a projection image of the imaging body part may be obtained at the detector 18. In some embodiments, data, such as projection image data, received by the radiation detector 18 may be electrically and/or wirelessly communicated to the controller 44 from the radiation detector 18. The controller 44 may then reconstruct one or more x-ray images based on the projection image data, by implementing a reconstruction algorithm, for example. The reconstructed image may be displayed to the user on the user interface 50 via a display screen 56.

The radiation source 16, along with the radiation detector 18, forms part of the x-ray system 10 which provides x-ray imagery for the purpose of one or more of screening for abnormalities, diagnosis, dynamic imaging, and image-guided biopsy. For example, the x-ray system 10 may be operated in a mammography mode for screening for abnormalities. During mammography, a patient's breast is positioned and compressed between the detector 18 and the compression paddle 40. Thus, a volume of the x-ray system 10 between the compression paddle 40 and the detector 18 is an imaging volume. The radiation source 16 then emits radiation rays on to the compressed breast, and a projection image of the breast is formed on the detector 18. The projection image may then be reconstructed by the controller 44, and displayed on the interface 50. During mammography, the gantry 15 may be adjusted at different angles to obtain images at different orientations, such as a cranio-caudal (CC) image and a medio-lateral oblique (MLO) image. In one example, the gantry 15 may be rotated about the axis 58 while the compression paddle 40 and the detector 18 remain stationary. In other examples, the gantry 15, the compression paddle 40, and the detector 18 may be rotated as a single unit about the axis 58.

Further, the x-ray system 10 may be operated in a tomosynthesis mode for performing digital breast tomosynthesis (DBT). During tomosynthesis, the x-ray system 10 may be operated to direct low-dose radiation towards the imaging volume (between the compression paddle 40 and the detector 18) at various angles over the angular range of the x-ray system 10. Specifically, during tomosynthesis, similar to mammography, the breast is compressed between the compression paddle 40 and the detector 18. The radiation source 16 is then rotated from −θ to +θ, and a plurality of projection images of the compressed breast is obtained at regular angular intervals over the angular range. For example, if the angular range of the x-ray system is ±11 degrees, 22 projection images may be captured by the detector during an angular sweep of the gantry at approximately one every one degree. The projection images are then processed by the controller 44 to generate a plurality of DBT image slices. The processing may include applying one or more reconstruction algorithms to reconstruct three dimensional images of the breast. Furthermore, the x-ray system may be configured to perform a DBT-guided biopsy procedure. Accordingly, in some exemplary embodiments, the system 10 may further include a biopsy device comprising a biopsy needle for extracting a tissue sample for further analysis.

In some examples, digital mammography system 100 may be configured to perform contrast imaging where contrast agents, such as iodine, can be injected into the patient that travel to the region of interest (ROI) within the breast (e.g., a lesion). The contrast agents are taken up in the blood vessels surrounding a cancerous lesion in the ROI, thereby providing a contrasting image for a period of time with respect to the surrounding tissue, enhancing the ability to locate the lesion.

The use of a contrast agent can be coupled with images of the ROI taken using dual-energy imaging processes and technology. In dual-energy imaging, low-energy (LE) and high-energy (HE) images are taken of the ROI. In particular, contrast enhanced spectral mammography (CESM) (2D) and contrast enhanced digital breast tomosynthesis (CE-DBT) (3D) imaging modalities are performed with dual-energy technology. For each view (single view in CESM, multiple views for CE-DBT), a pair of images is acquired: a low-energy (LE) image and a high-energy (HE) image. In CE-DBT, non-paired HE and LE images may be acquired for each view and an HE volume, LE volume, and recombined CE volumes may be reconstructed for the ROI. For example, the HE and LE views may be interleaved during the CE-DBT scan (alternatively HE, LE, HE, LE, HE, LE, etc.) with a switch from HE to LE then to HE again etc., for each angulated position of the x-ray tube. The LE and HE images are usually obtained at mean energies above and below the K-edge of the contrast agent. At x-ray energies just above the k-edge of the contrast agent, the absorption of x-rays is increased resulting in an increase of contrast from the iodine contrast agent in the HE image.

In dual-energy 3D or stereotactic procedures, LE and HE image acquisitions are performed, with at least two different positions of the X-ray source with respect to the detector. The images are then recombined to display material-specific information with regard to the internal structure of the tissue being imaged. In the case of 3D CESM, for example, after the injection of contrast medium, dual-energy images are acquired at two or more positions of the x-ray tube with respect to the detector. For each of these tube angulations, the low and high-energy images are recombined to produce an image of the contrast medium surface concentration at each pixel to provide an iodine-equivalent or dual-energy (DE) image(s) (for a single view in CESM, and for multiple views for CE-DBT), which in CE-DBT, are used to reconstruct a 3D volume. Image recombination may be performed based on simulations of the X-ray image chain, via calibrations on a reference phantom, or any other suitable 3D-reconstruction process. Additionally, in the continuous mode of acquisition where the X-ray tube moves continuously with interleaved HE and LE images being taken, the LE images are used to reconstruct a LE 3D volume, and the HE images are used to reconstruct a HE 3D volume, with both volumes being recombined in a suitable manner to provide an iodine 3D volume. One can as well implement an algorithm that combines 3D-reconstruction and HE/LE recombination in a single step.

Figure 2:
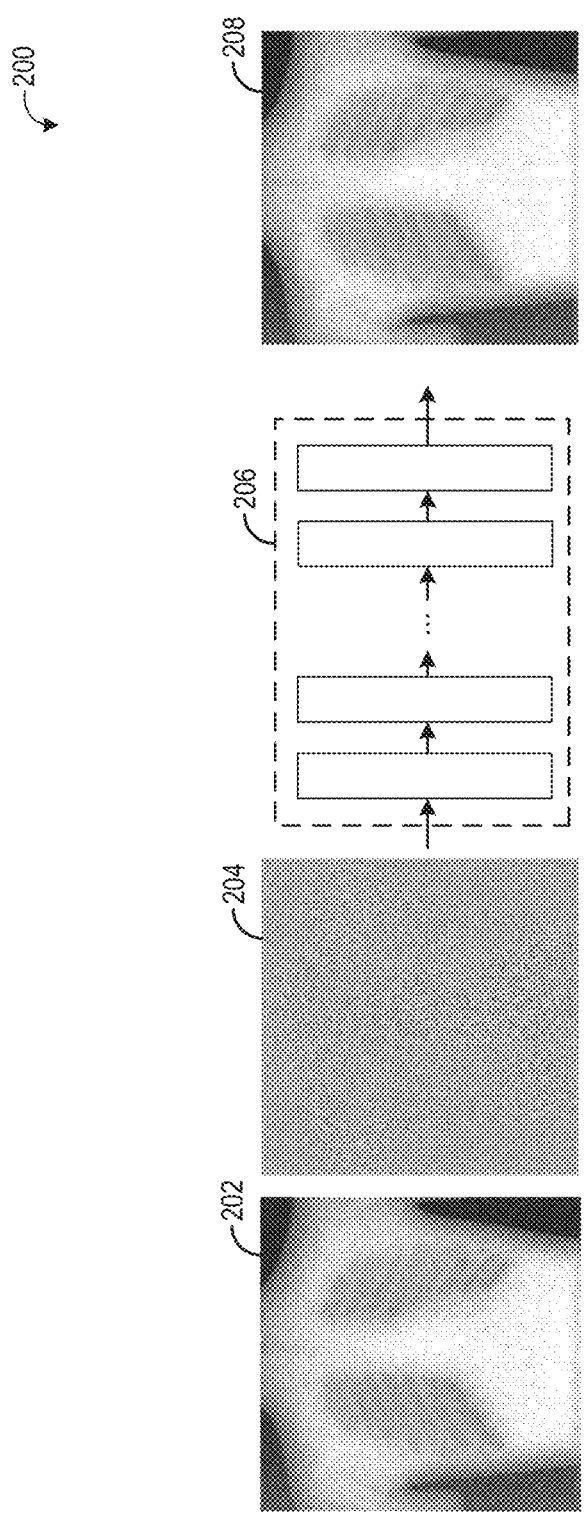
FIG. 2 schematically shows an example denoising model, according to an embodiment.

FIG. 2 schematically illustrates a denoising process 200 using an example denoising model. The denoising process 200 includes input of a noisy image 202 and a noise map 204 generated based on the noisy image 202 into a denoising network 206. The noisy image 202 may be any suitable image, such as an x-ray image of a subject acquired with an x-ray imaging system (which may utilize an x-ray source and a detector similar to the digital mammography system 100 of FIG. 1). The noise map 204 may represent a level of noise of each pixel of the noisy image 202, and may be generated with a noise model (additional details about generating a noise map with a noise model are presented below with respect to FIG. 9). The denoising network 206 may be a CNN or another suitable network trained to denoise the noisy image 202 using the noise map 204, such as a fast and flexible denoising convolutional network (FFDNet). The denoising network 206 is trained to output a denoised image 208.

Figure 3:
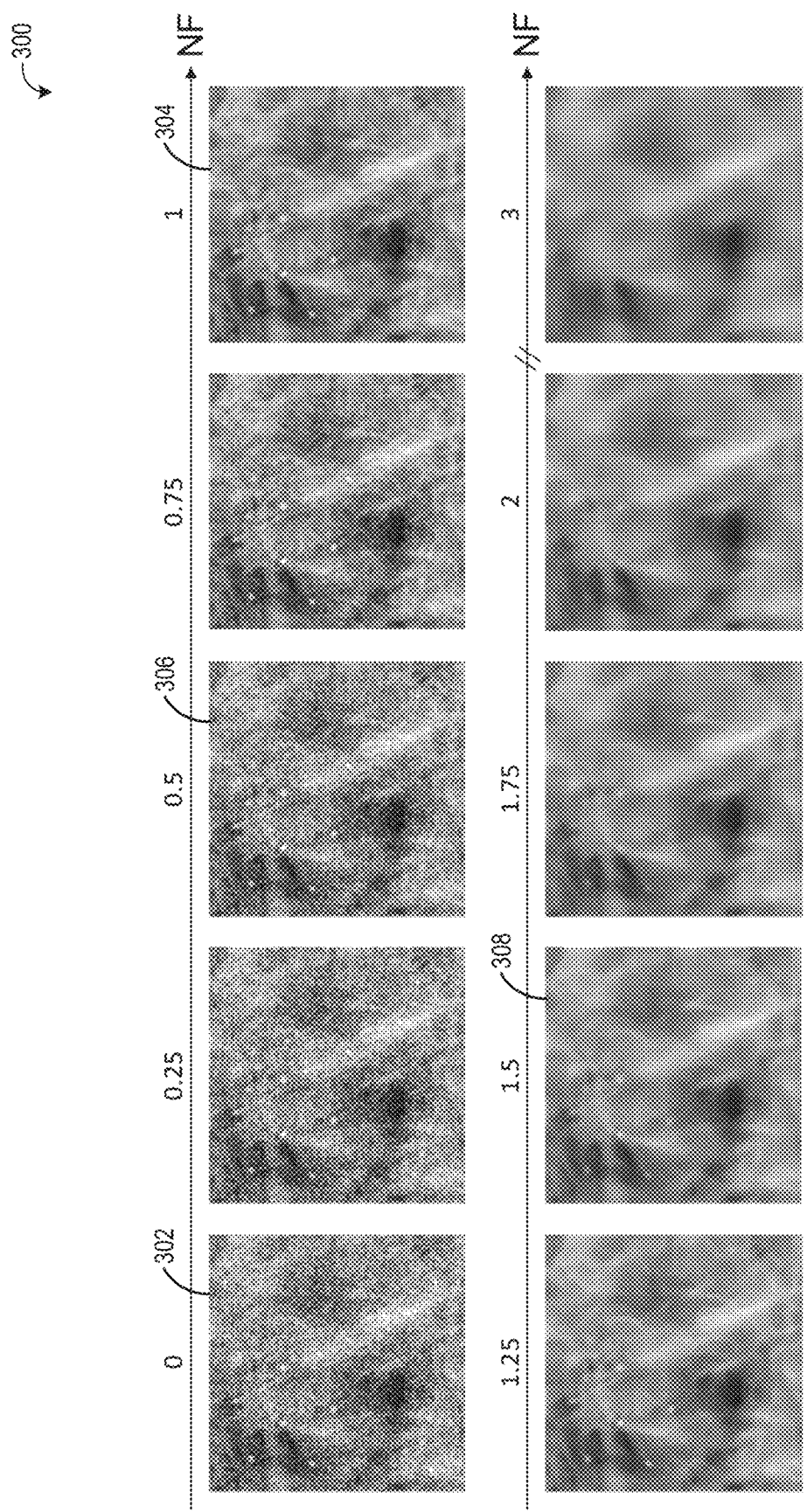
FIG. 3 is a set of denoised images illustrating a trade-off between denoising strength and feature preservation.

FIG. 3 illustrates a set of denoised images 300. Each image in the set of denoised images 300 may be denoised from the same noisy image using the denoising network 206 of FIG. 2, for example. Each image may be denoised with a noise map having a different strength, which may be referred to as the noise factor (NF). For example, a first image 302 may be denoised with a noise map having a noise factor of 0, which may represent that no denoising occurred. A second image 304 may be denoised with a noise map having a noise factor of 1, which may represent the noise map without scaling. Decreasing the noise factor of the noise map (e.g., scaling the strength of the noise map down) may result in increased detail preservation but decreased noise reduction. For example, a third image 306 may be a denoised image that was denoised with the noise map having a noise factor of 0.5. As appreciated from the third image 306 relative to the first image 302 and the second image 304, the scaled-down noise map may preserve detail relative to the second image 304 but may still exhibit noise-related artifacts such as fibers. Increasing the noise factor of the noise map (e.g., scaling the strength of the noise map up) may result in increased noise reduction but may also cause detail loss and/or unrealistic smoothing. For example, a fourth image 308 may be a denoised image that was denoised with the noise map having a noise factor of 1.5, which may result in enhanced noise reduction but also increased detail loss. Thus, lower noise factor values (and hence lower strength noise maps) may result in better detail preservation but may not sufficiently remove noise (such as fibers or hallucinations) while higher noise factor values (and hence higher strength noise maps) may reduce noise but introduce non-realistic over-smoothing. Accordingly, the strength of the noise map (e.g., the noise factor) may be selected to control the trade-off between noise reduction and detail preservation.

Figure 4:
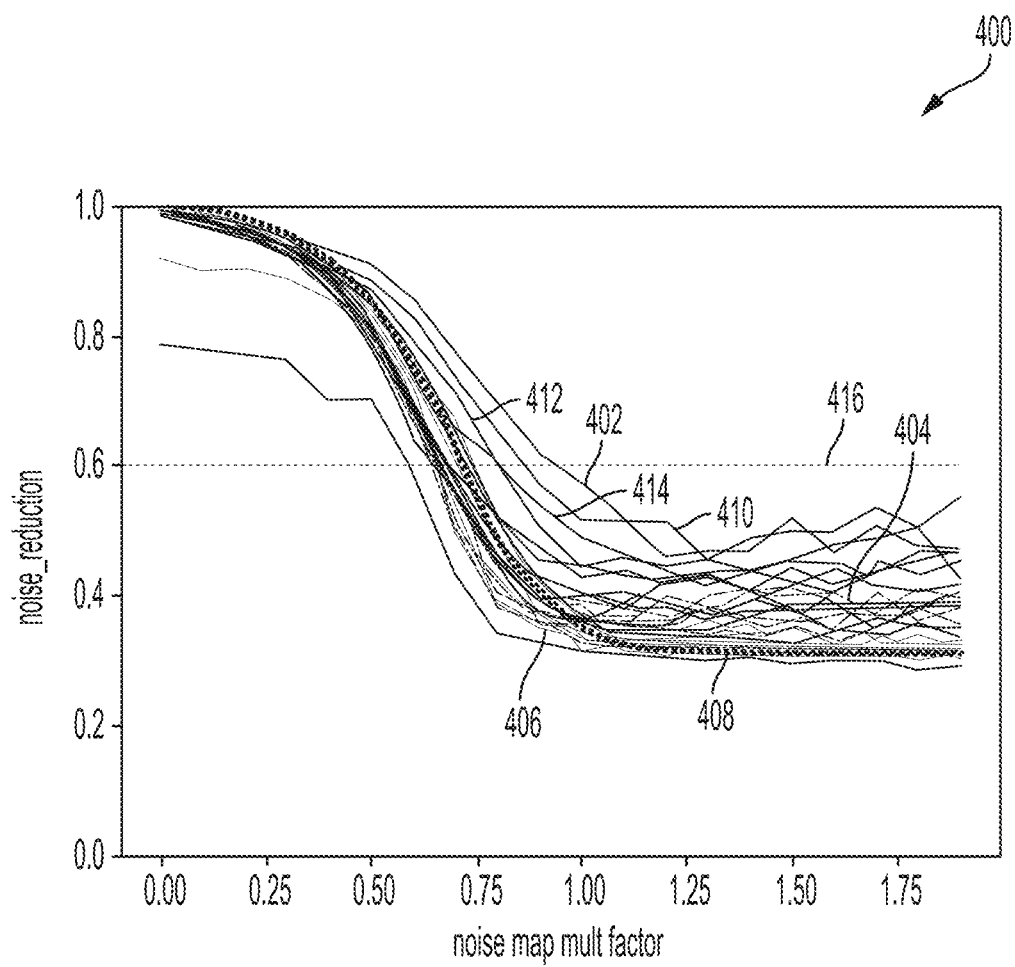
FIG. 4 is an example graph depicting image noise reduction as a function of denoising strength, for a plurality of different image signal levels.

FIG. 4 shows a graph 400 illustrating a quantitative impact of the noise factor and image signal level on noise reduction. Each line shown in graph 400 (such as first line 402) depicts noise reduction as a function of noise factor (referred to as the noise map multiplicative factor in FIG. 4) for a flat background image of a given background signal level (e.g., pixel intensity value/brightness) corrupted by Gaussian white noise of a given amount. For example, first line 402 (as well as the other bold solid lines in graph 400) represents the noise reduction as a function of noise factor for a flat background image of a first background level corrupted by Gaussian white noise with a noise standard deviation of 10. Second line 404 (as well as the other dashed-dotted lines in graph 400) represents the noise reduction as a function of noise factor for a flat background image of the first background level corrupted by Gaussian white noise with a noise standard deviation of 20. Third line 406 (as well as the other non-bold solid lines in graph 400) represents the noise reduction as a function of noise factor for a flat background image of the first background level corrupted by Gaussian white noise with a noise standard deviation of 40. Fourth line 408 (as well as the other dotted lines in graph 400) represents the noise reduction as a function of noise factor for a flat background image of the first background level corrupted by Gaussian white noise with a noise standard deviation of 80. A line is likewise depicted for the noise reduction for each flat background image of different background levels (e.g., signal levels), with each different amount of noise. For example, a fifth line 410, a sixth line 412, and a seventh line 414 depict the noise reduction as a function of noise factor for a flat background image corrupted by Gaussian white noise with a noise standard deviation of 10, for each of a second background level, a third background level, and a fourth background level, respectively. Thus, lines 402, 410, 412, and 414 each depict noise reduction as a function of noise factor for flat background images corrupted with the same amount of noise, but with different background levels for each image.

To generate each line plotted on graph 400, each noisy background image (e.g., each flat background image of different background levels corrupted with the Gaussian white noise at different amounts as described above) was denoised with denoising model (e.g., the denoising network of FIG. 2) using a noise map that represents the constant image equal to the noise standard deviation (of the noise applied to generate the noisy background image) times a corresponding noise factor (e.g., from a noise factor of 0 to a noise factor of 2). In other words, each noisy image was denoised multiple times using a noise map that reflects the noise used to generate the noisy image, and each time the noise map was scaled by a different noise factor. The noise reduction was calculated for each denoised image as a ratio of the noise standard deviation of the denoised image to the noise standard deviation of the noisy image.

Thus, as appreciated by graph 400, the amount of noise reduction that is achieved depends on the background level of the image (e.g., the signal intensity), the amount of noise in the image, and the noise factor for scaling the noise map. For example, comparing first line 402 to seventh line 414 (each representing images corrupted with the same amount of noise but having different background levels), denoising the image with a noise factor of 1 results in different noise reduction for the images, such that more noise reduction is achieved with a noise factor of 1 for the fourth background level than the noise reduction that is achieved with the noise factor of 1 for the first background level. Further, the images corrupted with a lower amount of noise (e.g., with a noise standard deviation of 10) may exhibit a higher variation in noise reduction based on the background level of the images than images corrupted with a higher amount of noise.

Thus, achieving a target noise reduction of an image depends not only on the amount of noise in the image and the noise factor selected to scale the noise map for denoising the image, but also on the signal level of the image. For example, if a target noise reduction of 0.6 is desired (shown by line 416) for an image having a relatively low amount of noise (e.g., standard deviation of 10), a noise factor of 0.8 may be suitable to achieve the target noise reduction if the image has a first signal level, but the noise factor of 0.8 may not achieve the target noise reduction if the image has a second, different signal level. This reliance on the signal level for the noise reduction may or may not be linear and may vary from denoising model to denoising model, which may preclude the application of simple signal level-based coefficients to adjust the noise factor used to scale the noise map.

According to embodiments disclosed herein, the above issues may be addressed by performing a calibration process on a denoising model trained to output a denoised image based on an input image and a noise map. The calibration process may include identifying a calibration function that may be used during inference to generate the noise map that is used to denoise the input image. As explained previously, the noise map may represent noise for each pixel of the input image, e.g., how much of each pixel's brightness/intensity value is due to noise. When the noise map is applied, the noise map can be scaled by a noise factor, also referred to as a strength value, to balance noise reduction with detail preservation. The calibration function may act to scale or select the strength of the noise map, e.g., select the noise factor used to adjust the noise map as described above, based on the signal level of the input image and a target noise reduction, to thereby form a noise map of a desired strength that is entered as input with the input image (and is applied by the denoising model to denoise the input image).

As used herein, the noise model refers to a function that provides a local noise estimate of a noisy image. The noise model may output the local noise estimate in the form of a noise map. Applying the noise model to the noisy image (or a smoothed version) provides a map of the noise estimate in each pixel, which is called the noise map. The noise map may include a noise value for each pixel of the noisy image, where value represents the noise at that pixel. The noise map may be visualized by assigning a brightness value to each noise value (and then may take on the form of the noise map 204 of FIG. 2). A denoising strength map (or simply a strength map) may refer to the actual map that is provided to the denoising model/network to tune denoising locally. The strength map may be generated by scaling or otherwise transforming the noise map by an amount or degree (referred to as the noise factor or the strength value herein).

The calibration function may be determined in various different manners depending on the goal of the image denoising and the type of input images to be denoised. In a first embodiment, described below with respect to FIGS. 5 and 6, the calibration function may be determined in a count-dependent manner based on raw images that exhibit count-dependent noise, such as unprocessed projection images obtained by an x-ray imaging system. In such examples, the calibration function may map the signal level of the input image to a strength map to achieve a target noise reduction. In a second embodiment, described below with respect to FIGS. 7 and 8, the calibration function may be determined in a count-independent manner based on processed or reconstructed images where there is no well-defined relationship between noise variance and signal level. In such examples, the calibration function may map the signal level and the noise level of the input image to a strength map to achieve a target noise reduction. In a third embodiment, described below with respect to FIGS. 10 and 11, the calibration function may be determined in order to enable low dose images (e.g., images obtained with a relatively low x-ray source output) to mimic high dose images (e.g., images obtained with a relatively high x-ray source output), and thus enable lower dose images to be obtained. In such examples, the calibration function may be configured to select a strength map for a target dose reduction.

For each of the embodiments described above, the calibration function may be determined using a set of calibration images, where each calibration image is a constant background image of a known signal level and corrupted with a known amount of noise. Each calibration image of the set of calibration images may be paired with a strength map of a set of strength maps of different strengths (e.g., scaled based on different noise factors) and entered as input to the denoising model. The strength maps may be generated using a noise model, which may output noise maps that are scaled to generate the strength maps, as explained below with respect to FIG. 9. The noise in the denoised image output by the denoising model may be measured and used to determine the noise reduction achieved by the input strength map. The relationship between the signal level of the calibration image and the noise reduction that is achieved with each strength map may be determined (as well as for each signal level and each noise level of the calibration images) and used to set the calibration function.

Figure 5:
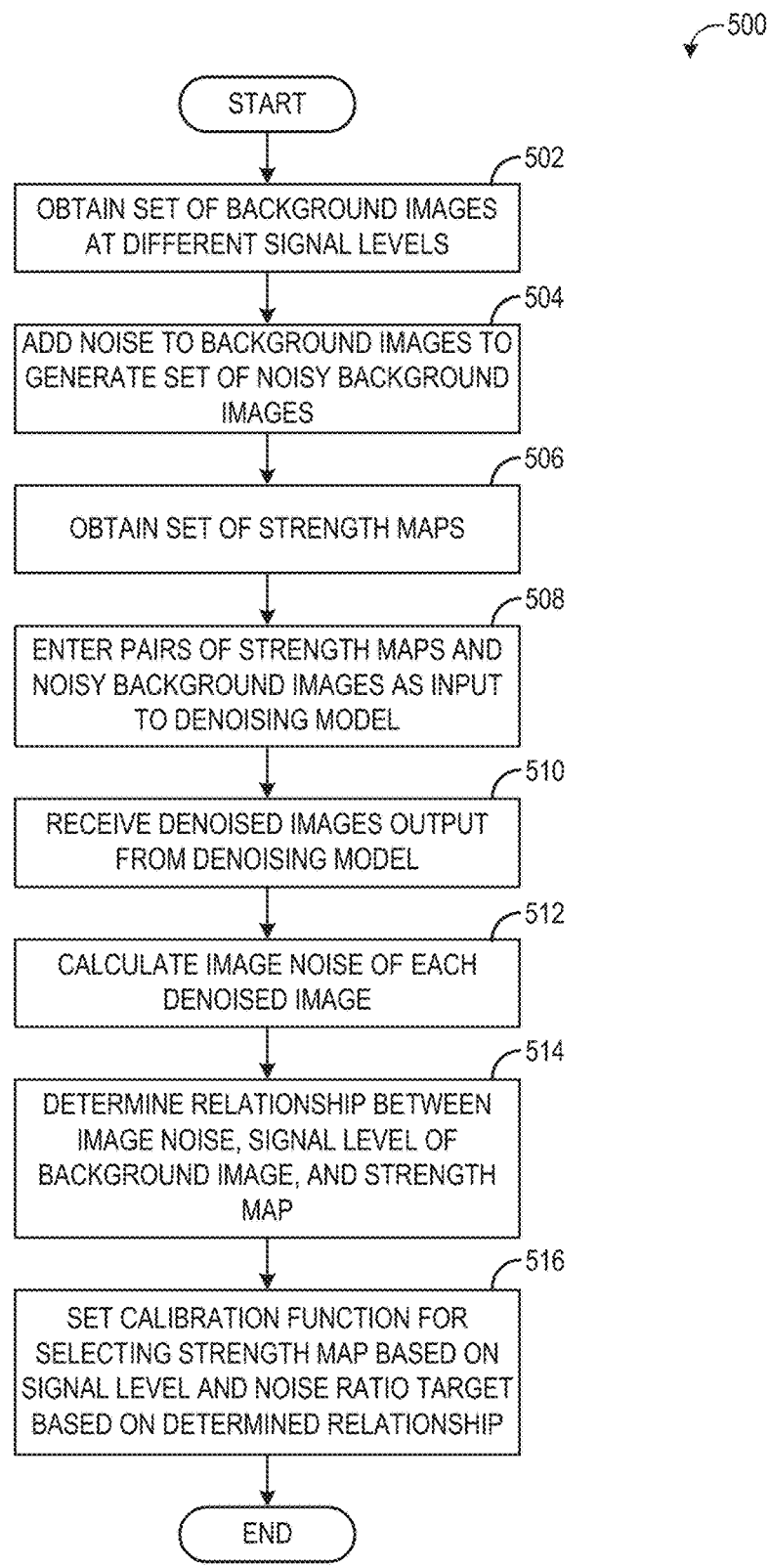
FIG. 5 is a flow chart illustrating a method for determining a calibration function for selecting a denoising strength map, according to a first embodiment of the disclosure.

FIG. 5 is a flow chart illustrating a method 500 for a determining a calibration function that may be applied to select a denoising strength map to denoise images acquired by an imaging system (e.g., digital mammography system 100 of FIG. 1), according to a first embodiment of the disclosure. Method 500 may be executed using computer readable instructions stored in the non-transitory memory of a computing device of an imaging system (e.g., digital mammography system 100 of FIG. 1) or a controller communicatively coupled to the imaging system (e.g., controller 44 of FIG. 1). In some embodiments, method 500 may be executed by another computing device without departing from the scope of this disclosure (e.g., a server, an edge device, a picture archiving and communication system (PACS)).

At 502, method 500 includes obtaining a set of background images, with each background image having a different signal level. The background images may be acquired with a suitable imaging system, such as the digital mammography system 100 of FIG. 1. However, other types of background images may be obtained, such as background images acquired by a computed tomography imager (CT), a positron emission tomography imager (PET), a combination PET-CT, an x-ray imager, or another suitable imaging system. The background images may be images obtained without an imaging subject and thus may represent unattenuated signals (e.g., x-ray beams) collected by the detector of the imaging system. Each background image may have a different signal level (e.g., pixel intensity/brightness). For example, each background image may be acquired with a different x-ray tube output (e.g., a different x-ray tube current) and/or with a different exposure time.

At 504, method 500 includes adding noise to each image of the set of background images to generate a set of noisy background images (e.g., the calibration images). Because each background image is acquired without an imaging subject, the amount of noise in each background image may be relatively low and/or may be relatively evenly distributed, which may not mimic noisy images obtained during patient exams. Thus, noise may be added to each background image, which may also allow the amount of noise in each background image to be known and controlled. The amount of noise that is added may be the same for each background image and may be realistic in terms of amount and distribution. For example, the noise that is added may be based on average amounts/distributions of noise in the images that the denoising model (explained below) is trained to denoise (e.g., digital mammography images). In some examples, a noise map may be generated based on an average noisy image for a given imaging modality and/or imaged anatomical region and the noise that is added to each background image may be based on the noise map.

At 506, the method 500 includes obtaining a set of strength maps. The set of strength maps may be generated based on a noise map (or noise maps) that represent the amount/distribution of noise in the noisy background images. For example, the strength maps may be generated based on the noise map used to corrupt the background images with noise, as explained above. The strength maps may be generated by applying a factor or factors to the noise map(s) generated as described previously, in order to generate a set of scaled noise maps of the images, herein referred to as strength maps. Each strength map may have a different "strength," e.g., a different factor that is applied to the noise map. In this way, each strength map is a scaled noise map.

At 508, the method 500 includes entering pairs of strength maps and noisy background images as input to a denoising model The denoising model is configured to take, as input, a noisy image and a noise map (indicative of the amount/distribution of noise in the noisy image) and output a denoised version of the noisy image. The denoising model may be a deep learning model, such as a neural network, or another suitable model. In some examples, the denoising model may be an FFDNet. In examples where the denoising model is a deep learning model, the denoising model may be trained with noisy training images and corresponding training noise maps, and in some examples, the deep learning model may be trained to specifically denoise images of a certain imaging modality (e.g., x-ray images) and/or of a certain anatomical feature (e.g., mammogram images). The denoising model may be fully trained and validated. The denoising model may be the denoising network described above with respect to FIG. 2.

The strength maps from the set of strength maps and the noisy background images may be paired such that each noisy background image is paired with each different strength map, and each pair is entered as input to the denoising model. In this way, each different noisy background image (having different signal levels) is denoised multiple times, each time with a different strength map. At 510, the method 500 includes receiving denoised images output from the denoising model. As explained above, the denoising model may output a denoised image for each input noisy background image, and each noisy background image may be denoised a different amount based on the strength map used to denoise the image.

At 512, the method 500 includes calculating the image noise of each denoised image output by the denoising model. In some examples, the image noise may be determined by calculating the noise standard deviation, though other mechanisms of determining the amount of noise in the denoised image may be within the scope of this disclosure. At 514, a relationship between the image noise (e.g., noise standard deviation) of each denoised image, the signal level of each background image, and the strength maps used to denoise the images may be determined. For example, the determined image noise of each denoised image may be used to determine a noise ratio for each denoised image (e.g., a ratio of the image noise of a denoised image to the image noise of the input image used to generate the denoised image). For each background image/signal level, the noise ratio achieved with each strength map may be analyzed (e.g., plotted as shown by above in FIG. 4) to determine the relationship.

At 516, the method 500 includes setting a calibration function for selecting a strength map based on signal level and noise ratio target based on the determined relationship. For example, a specific noise ratio target may be selected, such as 0.6. Based on the relationship determined at 514, a calibration function may be identified that defines the relationship between the signal level of an image to be denoised and the strength value of the strength map needed to achieve the selected noise ratio target. Looking to FIG. 4, a noise ratio target of 0.6 is shown by line 416, which intersects lines 402, 410, 412, and 414 at different points along the x-axis. In this specific example, the strength value needed to achieve the noise ratio target of 0.6 may increase linearly as image signal level decreases, and thus the calibration function may be a linear inverse function. However, the calibration function may be another type of function other than linear. A separate calibration function may be identified for each noise ratio target (e.g., 0.9, 0.8, 0.7, 0.6, etc.), at least in some examples. The calibration function(s) determined at 516 may be saved in memory and retrieved in order to select an appropriate strength map to denoise an image, as explained in more detail below.

Figure 6:
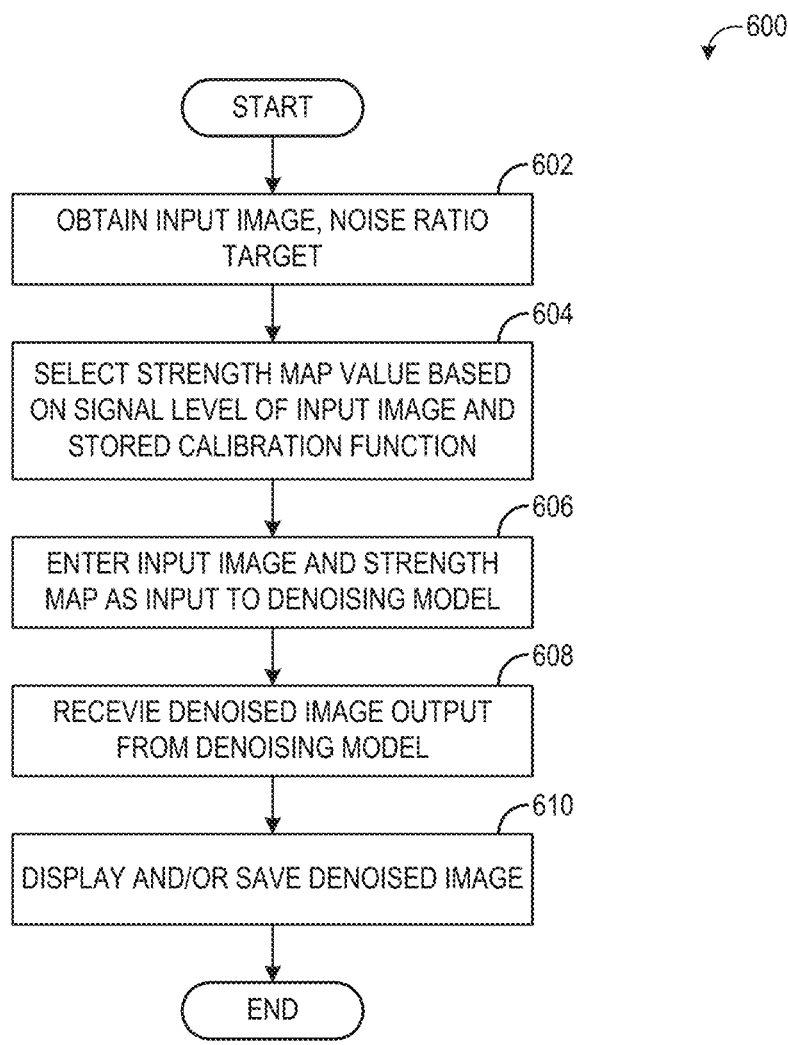
FIG. 6 is a flow chart illustrating a method for denoising an image using a denoising model and the calibration function determined using the method of FIG. 5.

FIG. 6 is a flow chart illustrating a method 600 for denoising an image using the calibration function determined by the method of FIG. 5. Method 600 may be executed using computer readable instructions stored in the non-transitory memory of a computing device of an imaging system (e.g., digital mammography system 100 of FIG. 1) or a controller communicatively coupled to the imaging system (e.g., controller 44 of FIG. 1). In some embodiments, method 600 may be executed by another computing device without departing from the scope of this disclosure (e.g., a server, an edge device, a picture archiving and communication system (PACS)). In some examples, method 600 may be carried out on the same computing device that carries out method 500. In other examples, method 600 may be carried out on a different computing device than the computer device that carries out method 500. For example, method 500 may be carried out on a server or other computing device. The trained denoising model and calibration function(s) determined according to method 500 may be saved on a different computing device, such as the controller 44 of FIG. 1, and method 600 may be executed on the different computing device using the saved denoising model and calibration function(s).

At 602, the method 600 includes obtaining an input image and a noise ratio target. The input image may be acquired with an imaging system, such as the digital mammography system of FIG. 1, and may include an imaging subject such as a patient. In some examples, as explained above, the denoising model may be trained to denoise images of a specific anatomical region and/or obtained with a specific imaging modality. In such examples, the input image may match the modality and/or anatomical region of the training images used to train the denoising model. Further, the input image may be a raw/unprocessed image where the signal level of the image directly correlates to the amount of noise in the image (e.g., an unprocessed projection image obtained with the mammography system of FIG. 1). The noise ratio target may be obtained based on user input (e.g., a user may enter a selection of a noise ratio target), based on a scan protocol or imaging exam protocol, or based on system settings (e.g., the noise ratio target may be a default setting or an administrator-set setting). As described above, the noise ratio target may be a desired amount of noise reduction to be achieved.

At 604, the method 600 includes selecting a strength map value based on the signal level of the input image and a stored calibration function (e.g., as defined in method 500 of FIG. 5). In some examples, the calibration function may be selected from among a plurality of possible calibration functions based on the selected noise ratio target. The signal level of the input image may be determined based on the imaging system parameters used to acquire the image (e.g., the x-ray source current/voltage and/or exposure time) and/or a measured pixel intensity/brightness of the input image. For example, an average pixel intensity value may be determined for the input image and the signal level may be determined based on the average pixel intensity value. The signal level of the input image may be entered into the calibration function to identify the strength map value (e.g., the strength value or noise factor) used to scale a noise map of the input image. The noise map may be generated by a noise model and scaled according to the identified strength map value, as explained below with respect to FIG. 9.

At 606, the method 600 includes entering the input image and a strength map as inputs to a denoising model. The strength map may be generated by scaling or transforming the noise map of the input image based on the selected strength map value. The denoising model may be the same denoising model used to determine the calibration function, as explained above with respect to FIG. 5. Thus, the denoising model may be trained to output a denoised image using the input image and strength map as inputs. At 608, the method 600 includes receiving a denoised image output from the denoising model. The denoised image is a denoised version of the input image. At 610, the method 600 includes displaying and/or saving the denoised image. For example, the denoised image may be displayed on a display device operably coupled to the computing device and/or saved in memory (e.g., as part of a patient exam). Method 600 then ends.

Thus, methods 500 and 600 provide for denoising images with strength maps tuned to provide a target noise reduction for a given signal level of the image to be denoised. In certain images such as projection x-ray images, the noise level in the image follows a known relationship with respect to the signal level (e.g., intensity), which is referred to as count dependent noise. In such cases, a series of images illustrating constant background corrupted with realistic noise (in terms of distribution and spectrum) may be used to calibrate the function for generating the denoising strength map.

For a series of different background levels, a series of denoising strength maps are produced and the standard deviation (of noise) of the inferred images (e.g., the denoised images output by the denoising model) is measured. It is thus possible to characterize the relationship between the denoising strength map value and the denoising factor (e.g., noise ratio/noise reduction) for each signal intensity level.

To achieve a given noise ratio/noise reduction, a specific denoising strength map can be generated in the form of a function of the signal intensity level. This leads to a denoising strength map that is designed to achieve a target noise reduction ratio across all (relevant) signal intensities. This target noise reduction ratio can be constant across all signal intensities, meaning that the noise is reduced by the same factor regardless of signal intensity. Alternatively, a custom signal-dependent target noise reduction ratio could be used in order to tweak the denoising strength for a certain range of signal intensities. Finally, if the denoising setting (e.g., target noise ratio) is relative to subjective image quality factors (noise look and feel for instance), one or more experts may be utilized to visually decide on the suitable denoising strength map for each sampled signal intensity level. In this latter case the characterization of denoising is not a simple ratio of standard deviations but is assessed by a qualified observer.

In some cases, it may be desired to apply the denoising network on processed or reconstructed images where there is no well-defined relationship between noise variance and signal level. In such cases, the denoising strength map function may be calibrated with respect to different flat background images with various signal levels and realistic noises of various standard deviations. This would result in a calibration function that can output the corresponding denoising strength map value for a given combination of signal intensity and noise standard deviation in order to achieve a specific target denoising strength. In practice when inferring on a given image, the local signal intensity (image value, or a local average of it) and the local noise standard deviation are known from a noise model. With these two inputs and a target noise reduction level, the desired denoising strength map may be determined. Similar to the embodiment described above, different noise reduction targets may be used, potentially subjective. This count-independent manner of selecting a strength map is described in more detail below with respect to FIG. 7.

Figure 7:
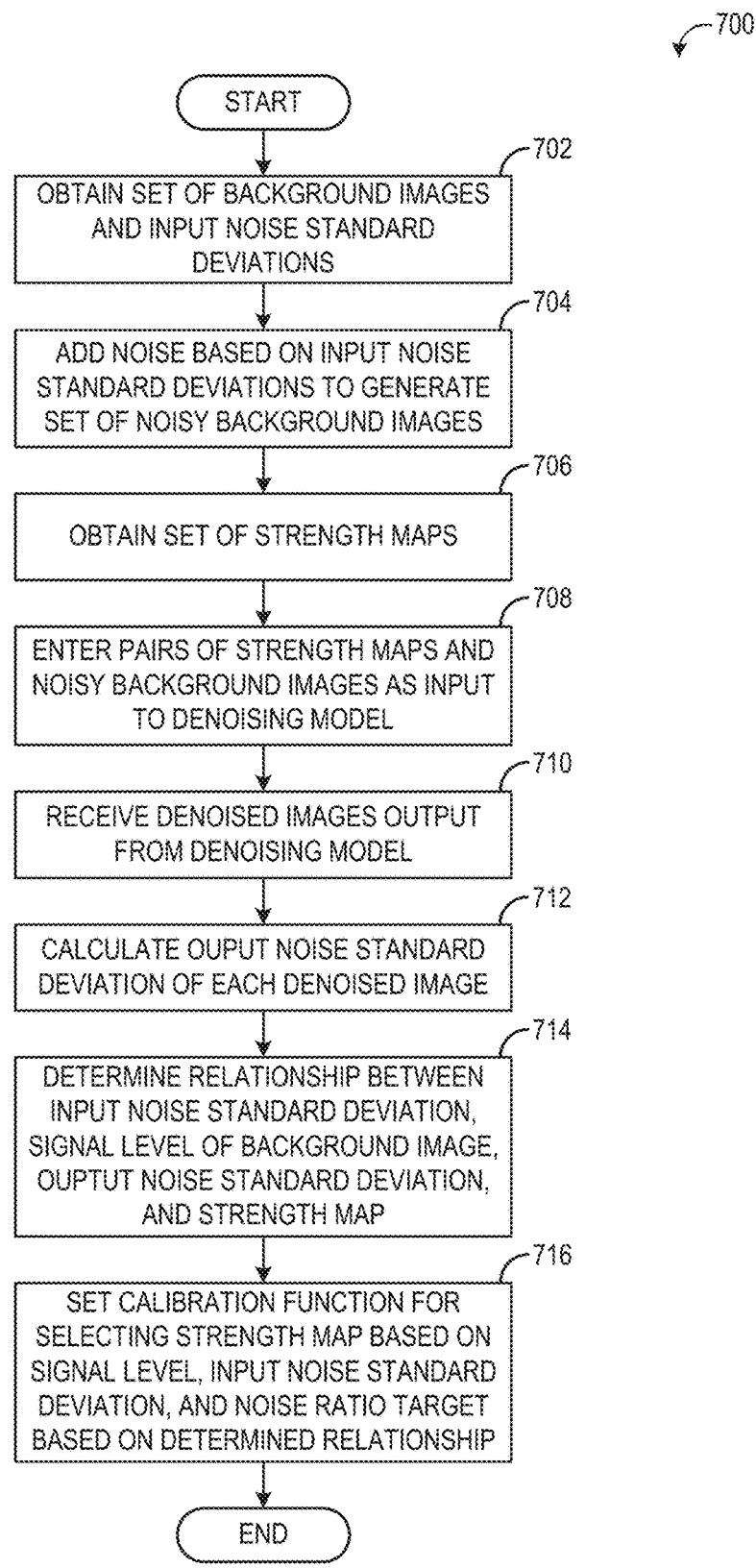
FIG. 7 is a flow chart illustrating a method for determining a calibration function for selecting a denoising strength map, according to a second embodiment of the disclosure.

FIG. 7 is a flow chart illustrating a method 700 for determining a calibration function that may be applied to select a denoising strength map to denoise images acquired by an imaging system (e.g., digital mammography system 100 of FIG. 1), according to a second embodiment of the disclosure. Method 700 may be executed using computer readable instructions stored in the non-transitory memory of a computing device of an imaging system (e.g., digital mammography system 100 of FIG. 1) or a controller communicatively coupled to the imaging system (e.g., controller 44 of FIG. 1). In some embodiments, method 700 may be executed by another computing device without departing from the scope of this disclosure (e.g., a server, an edge device, a PACS).

At 702, the method 700 includes obtaining a set of background images and input noise standard deviations. The set of background images may be the same background images obtained at 502 and discussed above with respect to FIG. 5, and thus may include images having different signal levels. The input noise standard deviations may represent different amounts of noise that are to be added to the background images. Thus, at 704, the method 700 includes adding noise to the background images based on the input noise standard deviations, to thereby generate a set of noisy background images. The set of noisy background images generated at 704 may be similar to the set of noisy background images generated at 504 of method 500. However, the set of noisy background images generated at 704 may have different amounts of noise added to each image (rather than the same amount of noise added to each background image as in method 500). In this way, the set of noisy background images generated at 704 includes background images of different signal levels and different amounts of noise.

At 706, the method 700 includes obtaining a set of strength maps. The set of strength maps may include one or more noise maps (generated based on the noisy background images) that are each scaled a different amount, similar to the strength maps obtained at 506 of method 500. At 708, the method 700 includes entering pairs of strength maps and noisy background images as input to a denoising model. The denoising model may be the same as or similar to the denoising model used in method 500, e.g., a neural network trained to output denoised images using input images and corresponding noise maps as inputs. The pairs of strength maps and noisy background images may be generated such that each combination of strength map and noisy background image is formed, and each pair may be entered into the denoising model separately.

At 710, the method 700 includes receiving denoised images output from the denoising model. Each denoised image is a denoised version of the corresponding noisy background image, which is denoised according to the corresponding strength map. At 712, the method 700 includes calculating an output noise standard deviation of each denoised image. The output noise standard deviation may represent the amount of noise in a given denoised image, and an output noise standard deviation may be determined for each denoised image output by the denoising model. At 714, the method 700 includes determining the relationship between the input noise standard deviation for each noisy background image, the signal level of each background image, the output noise standard deviation of each denoised image, and the strength maps. The relationship may be determined in a similar manner as the relationship described above with respect to 514 of FIG. 5, only including an addition parameter as a factor in determining the relationship (e.g., the input noise standard deviation of each noisy background image). At 716, the method 700 includes setting a calibration function for selecting a strength map based on a signal level, an input noise standard deviation, and a noise ratio target, based on the determined relationship. Once the relationship between the input noise standard deviation for each noisy background image, the signal level of each background image, the output noise standard deviation of each denoised image, and the strength maps is known, the relationship may be used to obtain a calibration function that maps image signal level and noise amount to a strength map strength for a given noise ratio target. For example, for each noise target (e.g., 0.7, 0.6, 0.5, or other suitable noise ratio targets), a calibration function may be determined from the relationship that defines the strength map strength value that will achieve the noise ratio target for an image with a given signal level and noise amount. The calibration function(s) may be linear or non-linear, as explained above with respect to FIG. 5, and may be saved in memory and deployed during model inference to select an appropriate strength map, as explained below.

Figure 8:
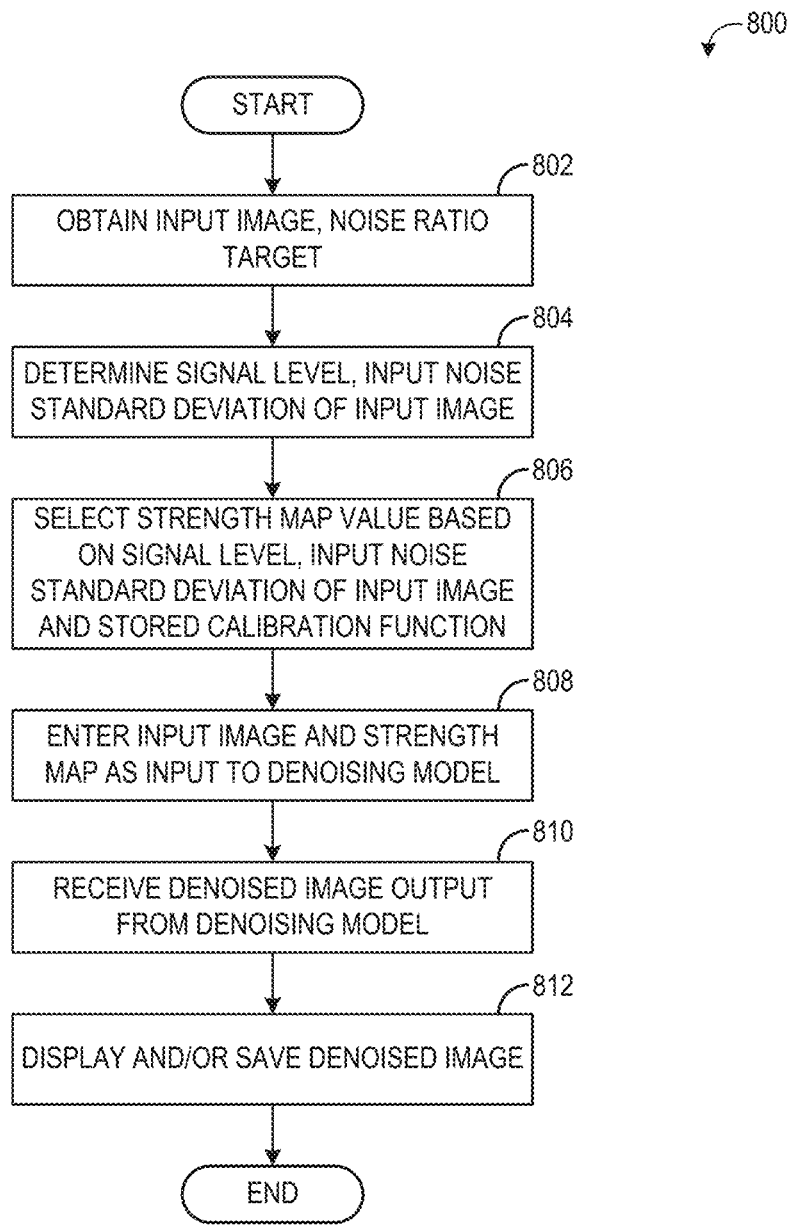
FIG. 8 is a flow chart illustrating a method for denoising an image using a denoising model and the calibration function determined using the method of FIG. 7.

FIG. 8 is a flow chart illustrating a method 800 for denoising an image using the calibration factor determined by the method of FIG. 7. Method 800 may be executed using computer readable instructions stored in the non-transitory memory of a computing device of an imaging system (e.g., digital mammography system 100 of FIG. 1) or a controller communicatively coupled to the imaging system (e.g., controller 44 of FIG. 1). In some embodiments, method 800 may be executed by another computing device without departing from the scope of this disclosure (e.g., a server, an edge device, a PACS). In some examples, method 800 may be carried out on the same computing device that carries out method 700. In other examples, method 800 may be carried out on a different computing device than the computer device that carries out method 700. For example, method 700 may be carried out on a server or other computing device. The trained denoising model and calibration function(s) determined according to method 700 may be saved on a different computing device, such as the controller 44 of FIG. 1, and method 800 may be executed on the different computing device using the saved denoising model and calibration function(s).

At 802, the method 800 includes obtaining an input image and obtains a noise ratio target. The input image may be acquired with an imaging system, such as the digital mammography system of FIG. 1, and may include an imaging subject such as a patient. In some examples, as explained above, the denoising model may be trained to denoise images of a specific anatomical region and/or obtained with a specific imaging modality. In such examples, the input image may match the modality and/or anatomical region of the training images used to train the denoising model. Further, the input image may be a processed image where the signal level of the image does not directly correlate to the amount of noise in the image (e.g., an image obtained with the mammography system of FIG. 1 that has been processed, such as an image reconstructed from multiple views/projections). The noise ratio target may be obtained based on user input (e.g., a user may enter a selection of a noise ratio target), based on a scan protocol or imaging exam protocol, or based on system settings (e.g., the noise ratio target may be a default setting or an administrator-set setting). As described above, the noise ratio target may be a desired amount of noise reduction to be achieved.

At 804, the method 800 includes determines a signal level and an input noise standard deviation of the input image. The signal level may be determined as discussed above (e.g., based on the pixel intensity values of the input image) and the input noise standard deviation may represent a measurement of the amount of noise in the input image. At 806 the method 800 includes selecting a strength map value based on the signal level, the input noise standard deviation of input image, and the stored calibration function. For example, a calibration function may be selected from one or more calibration functions stored in memory, based on the noise ratio target. The signal level and input noise standard deviation may be entered as inputs to the selected calibration function, and the calibration function may output/identify a strength map value (e.g., strength value or noise factor) based on the signal level and the input noise standard deviation. Once the strength map strength value (e.g., the noise factor) is determined, the strength map strength value may be used to scale a noise map of the input image to generate the strength map.

At 808, the method 800 includes entering the input image and the strength map as input to a denoising model. The denoising model may be the same denoising model used to generate the calibration functions, and thus may be trained to output a denoised version of the input image using the strength map. At 810, the method 800 receives a denoised image output from denoising model. The denoised image is the denoised version of the input image as output from the denoising model. At 812, the method 800 includes displaying and/or saving the denoised image, as explained above with respect to FIG. 6. Method 800 then ends.

In this way, methods 700 and 800 provide for generating and applying calibration function(s) to select a strength map to achieve a target noise reduction for an image having a given signal level and amount of noise. By including the amount of noise in the input image as a factor for selecting the strength map, an appropriate strength map can be selected for the input image, even when the input image is processed and the signal level is not necessarily directly correlated to the amount of noise in the image.

The methods described herein include the generation of strength maps, which are scaled noise maps. The noise maps and strength maps described herein may be generated using a noise model, which may be a different model than the denoising models described herein. The noise model provides, for a given noisy image, an estimate of the local noise standard deviation. In projection x-ray images, the noise model is often a simple relationship (e.g., noise_sdev=sqrt(a*signal_intensity+b)). In processed or reconstructed images, the noise model may be derived through a more complicated process.

The noise map is used as an input to the construction of a strength map used to denoise images as described herein. The denoising strength map may be a simple function of the noise map: denoising_strength_map=f(noise_map). In a simple embodiment, the strength map is simply the noise map uniformly scaled by a multiplicative coefficient (f(x)=c·x where c is a fixed scalar value). In other embodiments, the strength map can have the form of more complex transformations of the noise map, such as power laws (f(x)=xmax·(x/xmax)^gamma) or combined functions of the noise map and of the signal intensity. The main advantage is to significantly reduce the number of parameters or calibrations necessary to generate the denoising strength map.

Figure 9:
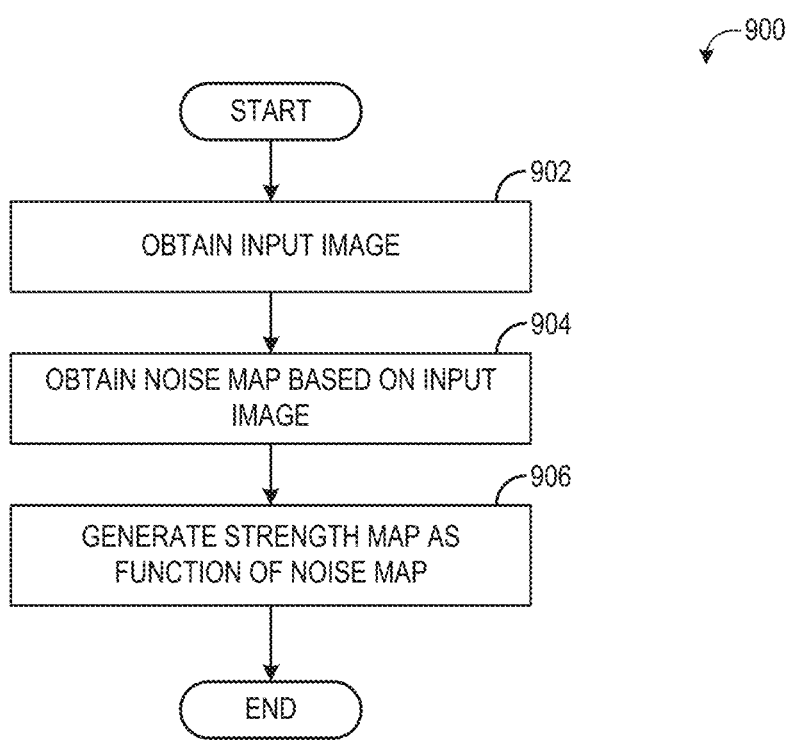
FIG. 9 is a flow chart illustrating a method for generating a denoising strength map, according to an embodiment.

FIG. 9 is a flow chart illustrating a method 900 for generating strength maps according to an embodiment of the disclosure. Method 900 may be executed using computer readable instructions stored in the non-transitory memory of a computing device of an imaging system (e.g., digital mammography system 100 of FIG. 1) or a controller communicatively coupled to the imaging system (e.g., controller 44 of FIG. 1). In some embodiments, method 900 may be executed by another computing device without departing from the scope of this disclosure (e.g., a server, an edge device, a PACS).

At 902, the method 900 includes obtaining an input image. The input image may be virtually any image obtained with an imaging system, such as an image acquired by the digital mammography system of FIG. 1. The input image may include an image subject (e.g., a patient) or may be a background image (in the case where the strength map is being generated for a calibration process as described above with respect to FIGS. 5 and 7). At 904, the method 900 includes obtaining a noise map based on the input image. The noise map may be generated by a noise model that is configured to output an estimate of noise for each pixel of the input image. At 906, the method 900 includes generating a strength map as a function of a noise map. As explained above, the strength map may be a scaled version of the noise map, and may be generated by uniformly scaling the noise map by a multiplicative coefficient ($f(x)=c \cdot x$ where c is a fixed scalar value) or by applying more complex transformations to the noise map. In examples where the noise map is uniformly scaled by a coefficient, the coefficient may be the noise factor (also referred to herein as the strength map strength value), which as explained above may be selected according to a calibration function that maps a signal level of the input image to the noise factor. Method 900 then ends.

In some examples, instead of a target noise reduction ratio being the objective for selecting an appropriate strength map, a target dose increase is used to determine the calibration function. By doing so, the noise characteristics of a higher dose image may be emulated given a low dose (and noisier) image. To achieve this, similar to the embodiment described above with respect to FIG. 5, a series of noisy background images at various intensity levels are generated, then denoised using a series of constant denoising strength maps with varying values. Instead of determining which denoising strength map achieves a given noise reduction ratio, the denoising strength map that achieves a specific noise level that is equal to a higher dose image is determined. For example, for an intensity of X, to emulate the noise statistics of twice the dose, the noise level at a noisy background image with mean equal to 2× (this gives a noise level=sigma_high) is measured, then the noise level of the higher dose is normalized by the ratio (target noise level=sigma_high/2). The denoising strength map that yields a noise level similar to the target noise level is determined. The process is then repeated to cover the entire range of signal intensities of interest. Additional details about setting a calibration function to achieve a target dose reduction are provided below with respect to FIG. 10.

Figure 10:
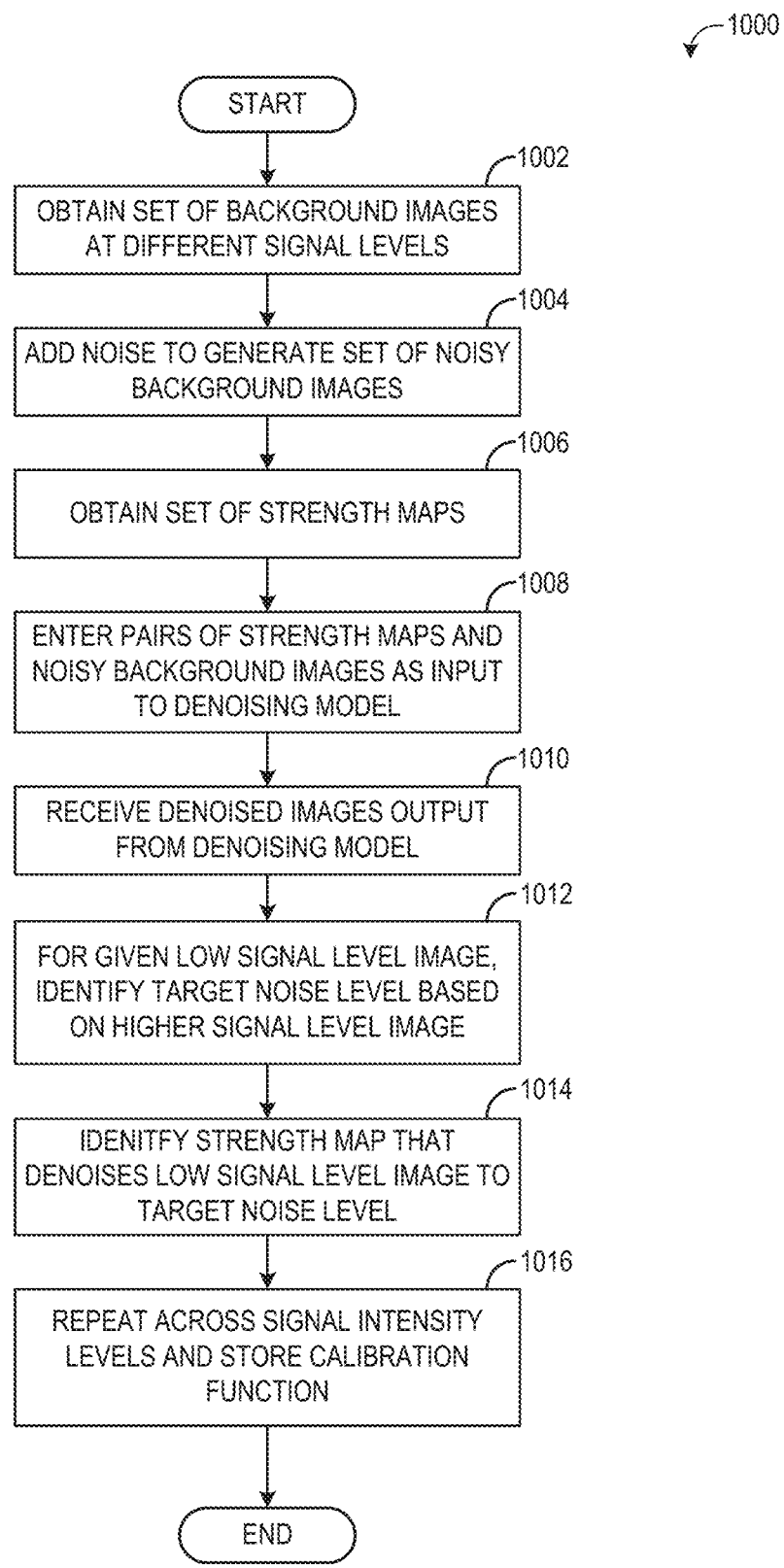
FIG. 10 is a flow chart illustrating a method for determining a calibration function for selecting a denoising strength map, according to a third embodiment of the disclosure.

FIG. 10 is a flow chart illustrating a method 1000 for a determining a calibration factor that may be applied to select a denoising strength map to denoise images acquired by an imaging system (e.g., digital mammography system 100 of FIG. 1), according to a third embodiment of the disclosure. Method 1000 may be executed using computer readable instructions stored in the non-transitory memory of a computing device of an imaging system (e.g., digital mammography system 100 of FIG. 1) or a controller communicatively coupled to the imaging system (e.g., controller 44 of FIG. 1). In some embodiments, method 1000 may be executed by another computing device without departing from the scope of this disclosure (e.g., a server, an edge device, a PACS).

At 1002, the method 1000 includes obtaining a set of background images at different signal levels. At 1004, the method 1000 includes adding noise to the background images to generate a set of noisy background images. The noisy background images generated in method 1000 may be generated in the same manner as the noisy background images of method 500, and thus description of 502 and 504 likewise applies to 1002 and 1004. At 1006, the method 1000 includes obtaining a set of strength maps. The set of strength maps may be obtained similarly to the set of strength maps obtained at 506 of method 500, and thus the description of 506 likewise applies to 1006.

At 1008, the method 1000 includes entering pairs of strength maps and noisy background images as inputs to a denoising model. The denoising model may be the same as or similar to the denoising model described above with respect to FIGS. 2, 5, and 7, and the pairs of strength maps and noisy background images may be formed and entered into the denoising model in the same manner as described above with respect to 508 of FIG. 5. At 1010, the method 1000 includes receiving denoised images output from the denoising model.

At 1012, the method 1000 includes, for a given low signal level noisy background image (e.g., a noisy background image having a low signal level relative to other noisy background images), identifying a target noise level based on a higher signal level noisy background image. For example, the noisy background images may include background images with ten different normalized signal levels ranging from 1-10. The noisy background image having a signal level of 1 may be selected as the low signal level input image. The target noise level may be identified by selecting a higher signal level noisy background image, such as the noisy background image having a signal level of 2, determining the noise level in the noisy background image having the signal level of 2, and normalizing the noise level based on a signal level ratio, which is a ratio of the lower signal level to the higher signal level (in this case, 1:2, such that the noise level of the noisy background image having the signal level of 2 is divided by 2). At 1014, the method 1000 includes identifying a strength map that denoises the low signal level image to the target noise level. As explained above, each noisy background image is denoised with a different strength map and each denoised image that is generated using the low signal level image may be analyzed to determine which strength map resulted in the denoised image having the target noise level. The identified strength map value (e.g., the strength value/noise factor that was applied to generate the identified strength map) may be stored in memory (e.g., in a look-up table indexed to signal level and signal level ratio). In some examples, the process may be repeated for other signal level ratios. For example, the higher signal level image may be the noisy background image having a signal level of 3, such that the signal level ratio is 1:3. At 1016, the method 1000 includes repeating the above-described process across signal intensity levels and storing a calibration function. For example, the process may be repeated for a noisy background image having a signal level of 2, which may identify the strength value of the strength map applied to achieve a denoised image having the noise level of a noisy background image having a signal level of 4 (assuming a 1:2 signal level ratio), a noisy background image having a signal level of 3, etc. The calibration function may be the look-up table described above, whereby each identified strength value is saved in the look-up table as a function of image signal level and signal level ratio. Method 1000 then ends.

Figure 11:
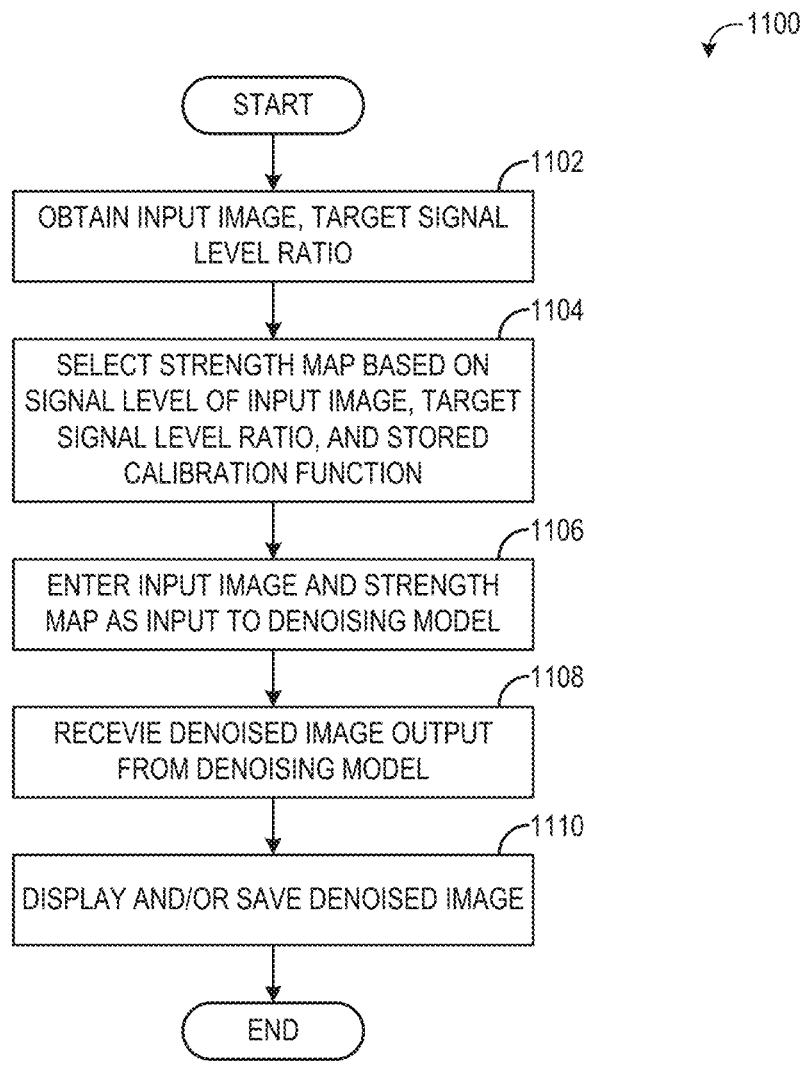
FIG. 11 is a flow chart illustrating a method for denoising an image using a denoising model and the calibration function determined using the method of FIG. 10.

FIG. 11 is a flow chart illustrating a method 1100 for denoising an image using the calibration factor determined by the method of FIG. 10. Method 1100 may be executed using computer readable instructions stored in the non-transitory memory of a computing device of an imaging system (e.g., digital mammography system 100 of FIG. 1) or a controller communicatively coupled to the imaging system (e.g., controller 44 of FIG. 1). In some embodiments, method 1100 may be executed by another computing device without departing from the scope of this disclosure (e.g., a server, an edge device, a PACS). In some examples, method 1100 may be carried out on the same computing device that carries out method 1000. In other examples, method 1100 may be carried out on a different computing device than the computer device that carries out method 1000. For example, method 1000 may be carried out on a server or other computing device. The trained denoising model and calibration function(s) determined according to method 1000 may be saved on a different computing device, such as the controller 44 of FIG. 1, and method 1100 may be executed on the different computing device using the saved denoising model and calibration function(s).

At 1102, the method 1100 includes obtaining an input image and a target signal level ratio. The input image may be the same as or similar to the input image described above with respect to FIGS. 6 and 8, e.g., an image including an imaging subject acquired with a suitable imaging modality. The target signal level ratio may be received via user input (e.g., a user may enter a selection of a target signal level ratio), based on a selected scan protocol or exam protocol, and/or based on system settings. At 1104, the method 1100 includes selecting a strength map based on the signal level of the input image, the target signal level ratio, and a stored calibration function. The signal level of the input image may be determined as described previously. The signal level of the input image and the target signal level ratio may be used to obtain a strength value from the stored calibration function, which may be the look-up table described above with respect to FIG. 10. The identified strength value may be applied to a noise map of the input image to generate a strength map. At 1106, the method 1100 includes entering the input image and the strength map as input to a denoising model. The denoising model may be the same denoising model as described above with respect to FIG. 10. At 1108, the method 1100 includes receiving a denoised image output from the denoising model. At 1110, the method 1100 includes displaying and/or saving the denoised image. Method 1100 then ends.

A technical effect of denoising an image using a strength map generated based on a calibration function that maps image signal level to a strength value for generating the strength map is that a target noise reduction in the image may be achieved without introducing unnecessary detail loss, in a manner tailored for the specific denoising model used to denoise the image. By tuning the strength map strength for the particular denoising model based on the signal level of the input images, the target noise reduction may be achieved for each image in a more consistent manner, which may reduce the number of times a given input image is denoised and thus may improve the efficiency of the computing device executing the denoising model.

The disclosure also provides support for a method, comprising: obtaining an input image and a noise map representing noise in the input image, generating, from the noise map and based on a calibration function, a strength map, entering the input image and the strength map as input to a denoising model trained to output a denoised image based on the input image and the strength map, and displaying and/or saving the denoised image output by the denoising model. In a first example of the method, the strength map comprises a scaled version of the noise map scaled by a noise factor, and wherein the noise factor is selected based on the calibration function. In a second example of the method, optionally including the first example, the calibration function comprises a relationship between the noise factor and a signal level of the input image to achieve a target denoising of the input image. In a third example of the method, optionally including one or both of the first and second examples, the calibration function comprises a relationship between the noise factor, an amount of noise in the input image, and a signal level of the input image to achieve a target denoising of the input image. In a fourth example of the method, optionally including one or more or each of the first through third examples, the calibration function comprises a relationship between the noise factor and a signal level of the input image to achieve a target signal level of the input image. In a fifth example of the method, optionally including one or more or each of the first through fourth examples, the calibration function is determined during a calibration phase and is retrieved from memory to generate the strength map. In a sixth example of the method, optionally including one or more or each of the first through fifth examples, obtaining the input image comprises obtaining the input image from an x-ray imaging system.

The disclosure also provides support for a system, comprising: memory storing instructions, and a processor configured to execute the instructions to: obtain an input image and a noise map representing noise in the input image, generate, from the noise map and based on a calibration function mapping a signal level of the input image to a strength value, a strength map, enter the input image and the strength map as input to a denoising model trained to output a denoised image based on the input image and the strength map, and display and/or save the denoised image output by the denoising model. In a first example of the system, the strength map comprises a scaled version of the noise map scaled by the strength value. In a second example of the system, optionally including the first example, the calibration function maps the signal level of the input image to the strength value to achieve a target denoising of the input image. In a third example of the system, optionally including one or both of the first and second examples, the calibration function maps the signal level of the input image and an amount of noise in the input image to the strength value to achieve a target denoising of the input image. In a fourth example of the system, optionally including one or more or each of the first through third examples, the calibration function maps the signal level of the input image to the strength value to achieve a target signal level of the input image. In a fifth example of the system, optionally including one or more or each of the first through fourth examples, the calibration function is determined during a calibration phase and is retrieved from the memory to generate the strength map. In a sixth example of the system, optionally including one or more or each of the first through fifth examples, the system further comprises: an imaging system, and wherein the input image is acquired with the imaging system. In a seventh example of the system, optionally including one or more or each of the first through sixth examples, the imaging system is an x-ray imaging system.

The disclosure also provides support for a method, comprising: inputting a plurality of pairs of noisy images and strength maps to a trained denoising model, the plurality of pairs of noisy images and strength maps comprising noisy images of different signal levels and strength maps of different strengths, receiving as output from the trained denoising model a denoised version of each input noisy image, generating, based on the denoised version of each input noisy image, a calibration function that maps a signal level of each noisy image to a strength map value to achieve a target noise reduction, and saving the calibration function in memory. In a first example of the method, each noisy image is acquired with an x-ray imaging system. In a second example of the method, optionally including the first example, each strength map comprises a noise map scaled by a strength value, each noise map representing an amount of noise in a respective noisy image. In a third example of the method, optionally including one or both of the first and second examples, generating the calibration function comprises calculating a respective amount of image noise in each denoised version of each input noisy image and generating the calibration function based on the signal level of each noisy image, the respective amount of image noise in each denoised version of each input noisy image, and each strength map strength. In a fourth example of the method, optionally including one or more or each of the first through third examples, the calibration function is configured to be applied during inference of the trained denoising model to select a strength map to denoise an input image.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   obtaining an input image and a noise map representing noise in the input image;
   generating a strength map from the noise map, the strength map a scaled version of the noise map scaled by a noise factor generated as an output of a calibration function based on a signal level of the input image;
   entering the input image and the strength map as input to a denoising model trained to output a denoised image based on the input image and the strength map; and
   displaying and/or saving the denoised image output by the denoising model.

2. The method of claim 1, wherein the calibration function is selected from among a plurality of calibration functions based on a noise ratio target of the input image.

3. The method of claim 2, wherein the calibration function generates the noise factor based on a signal level of the input image to achieve the noise ratio target of the input image.

4. The method of claim 2, wherein the calibration function generates the noise factor based on an amount of noise in the input image, and a signal level of the input image to achieve the noise ratio target of the input image.

5. The method of claim 2, wherein the calibration function generates the noise factor based on a signal level of the input image to achieve a target signal level of the input image.

6. The method of claim 2, wherein the calibration function is determined during a calibration phase and is retrieved from memory to generate the strength map.

7. The method of claim 1, wherein obtaining the input image comprises obtaining the input image from an x-ray imaging system.

8. A system, comprising:
   memory storing instructions; and
   a processor configured to execute the instructions to:
      obtain an input image and a noise map representing noise in the input image;
      generate a strength map from the noise map, the strength map a scaled version of the noise map scaled by a noise factor generated as an output of a calibration function based on a signal level of the input image;
      enter the input image and the strength map as input to a denoising model trained to output a denoised image based on the input image and the strength map; and
      display and/or save the denoised image output by the denoising model.

9. The system of claim 8, wherein the calibration function is selected from among a plurality of calibration functions based on a noise ratio target of the input image.

10. The system of claim 9, wherein the calibration function maps the signal level of the input image to the noise factor to achieve the noise ratio target of the input image.

11. The system of claim 9, wherein the calibration function maps the signal level of the input image and an amount of noise in the input image to the noise factor to achieve the noise ratio target of the input image.

12. The system of claim 8, wherein the calibration function maps the signal level of the input image to the noise factor to achieve a target signal level of the input image.

13. The system of claim 8, wherein the calibration function is determined during a calibration phase and is retrieved from the memory to generate the strength map.

14. The system of claim 8, further comprising an imaging system, and wherein the input image is acquired with the imaging system.

15. The system of claim 14, wherein the imaging system is an x-ray imaging system.

* * * * *